United States Patent [19]

Lucius

[11] Patent Number: 4,917,200
[45] Date of Patent: Apr. 17, 1990

[54] STEERING METHOD AND APPARATUS FOR SKID-STEERING VEHICLE

[76] Inventor: Ivan R. Lucius, 106 Columbia Ave., Box 642, Vicksburg, Miss. 39180

[21] Appl. No.: 230,719

[22] Filed: Aug. 10, 1988

Related U.S. Application Data

[63] Continuation of Ser. No. 885,419, Jul. 14, 1986, abandoned.

[51] Int. Cl.⁴ .................. B62D 11/10; B62D 11/18
[52] U.S. Cl. .................................. 180/6.2; 74/425; 74/718; 74/720; 180/6.3; 180/6.44; 180/6.48; 475/23
[58] Field of Search ............ 180/6.44, 6.2, 6.24, 180/6.3, 6.48, 7.1, 79.3, 9; 74/687, 718, 720, 720.5, 425

[56] References Cited

U.S. PATENT DOCUMENTS

| | | | |
|---|---|---|---|
| 1,984,830 | 12/1934 | Higley | 74/720.5 |
| 2,025,513 | 12/1935 | Johnston | 74/720.5 |
| 2,336,911 | 12/1943 | Zimmerman | 74/687 |
| 2,563,982 | 8/1951 | Warner | 74/675 |
| 2,580,946 | 1/1952 | Orshansky | 74/720.5 |
| 2,851,137 | 9/1958 | Gravenstine | 74/425 X |
| 3,320,829 | 5/1967 | Cull | 74/687 |
| 3,371,734 | 3/1968 | Zaunberger et al. | 74/720.5 X |
| 3,395,671 | 8/1968 | Zimmerman | 180/6.44 |
| 3,450,218 | 6/1969 | Looker | 180/6.44 |
| 4,393,952 | 7/1983 | Schreiner | 180/6.44 |

Primary Examiner—Mitchell J. Hill

[57] ABSTRACT

Improved steering systems are provided for skid-steering vehicles such as military tanks, track-type tractors and the like. A diesel engine may be used to rotate a drive shaft interconnected by port and starboard planetary gear assemblies, to apply driving power simultaneously to both track-drive mechanisms. Steering is provided by port and starboard hydraulically-actuated motors, each positively interconnected with the ring gear or other suitable component of its respective planetary gear assembly, whereby each track-drive mechanism may be controlled separately and independently of the other.

10 Claims, 3 Drawing Sheets

STEERING METHOD AND APPARATUS FOR SKID-STEERING VEHICLE

This is a continuation to application Ser. No. 06/885,419, filed July 14, 1986 now abandoned.

BACKGROUND OF INVENTION

This invention relates to skid-steered automotive devices such as tractors, military tanks, and other such vehicles which move on endless tracks, and more particularly relates to improved methods and apparatus for driving and steering such track-type vehicles and the like. Hereinafter, the term track-type vehicle will be intended to include any type of skid-steered vehicle.

It is well known that all track-type vehicles are relatively quite heavy, and that considerable power is therefore required merely to move such a vehicle in a longitudinal direction. Accordingly, most track-type vehicles require either a gasoline-driven or a diesel engine to generate sufficient motive power to meet the requirements of such devices.

It should be noted, however, that the power requirements for operating a track-type vehicle are not due solely to the relatively great mass of this type of equipment. Such devices also require abnormally large amounts of power for steering purposes, in addition to the power required merely to move such vehicles.

More particularly, it is well known that track-type vehicles are steered by selectively slowing or immobilizing one track, whereby the vehicle tends to drag this track along the ground while turning in the intended direction. Therefore, even greater power is required merely to maintain velocity whenever the vehicle is sought to be deflected from its axial course of travel. Otherwise, the vehicle will tend to slow, or even stop, merely because it is turned in one direction or the other, and this creates an additional load or demand for power which is undesirable if both driving and steering is to be accomplished with power derived from a single or common source.

This problem was initially sought to be solved or at least minimized by providing additional hydraulically actuated engines for separately powering the two track-drive mechanisms. Although this solution did tend to eliminate or greatly reduce the demands for power being made on the main engine (hereinafter the "prime mover") by the steering mechanisms in the vehicle, it greatly added to the overall weight of the vehicle.

Although such an arrangement can obviously achieve some savings in power, it is also expensive to install and maintain such auxiliary equipment. Furthermore, this addition not only makes the vehicle more complicated to operate, the addition of such auxiliary equipment adds greatly to the overall weight of the vehicle, and this may offset the savings in power sought to be achieved.

In another attempt to solve this problem of vehicle weight, hydraulically-actuated steering motors have been substituted for the heavier gasoline-driven engines previously incorporated merely to steer the vehicle. A hydraulic engine is well known to have a lower power capability than a gasoline-driven engine of comparable size, however, and therefore provision of a secondary engine merely to provide steering power for the vehicle has often required the addition of transmissions or other speed reduction units for each steering motor, which has also contributed to the overall weight of the vehicle. In addition;, all of this additional equipment tends to increase the overall cost of the vehicle, and to further make the vehicle more complicated to both operate and maintain.

In order to simplify operation of the vehicle, there have been arrangements designed to synchronize the two steering systems whereby one track-drive mechanism is slowed or stopped whenever the other driving mechanism is accelerated. Although such a modification does operate to achieve its intended purpose, it also tends to limit the degree of control which the operator has over the vehicle, and it further adds to the cost of the vehicle.

In other arrangements, separate braking systems have been provided for both track-drive mechanisms, whereby the operator is given greater discretionary control of the vehicle.

Under many working conditions tractors with conventional clutch-and-brake steering mechanisms cannot be maneuvered to perform useful work, because whenever one of the steering clutches is disengaged the power to that side of the tractor is effectively interrupted. The other side of the tractor then has to pull the entire load in order to maintain momentum, and in many cases the soil strength under one track is inadequate to carry the total load. When this situation is encountered, the powered track tends to shear the soil and to cause the vehicle to lose traction.

A suitable braking mechanism will obviously give the operator greater control over the vehicle. However, braking systems inherently present a maintenance and repair problem, and provision of a separate braking system for each track mechanism will also add to the overall complexity and cost of the vehicle.

In another arrangement, geared steering mechanisms are are provided whereby one track is driven at a lower speed than the other, by means of gear sets in the drive train, rather than disconnecting the steering motor or track mechanism from the drive train for the track sought to be slowed or stopped. However an arrangement of this type is both complex and costly, because it requires duplicate planetary sets, gears, brakes and/or clutches for each drive train.

Various other arrangements have, from time-to-time been proposed to improve the steering capabilites of track-type vehicles. Notwithstanding, whenever a remedy has been proposed which is effective to ameliorate one or more of the problems, the remedy has tended to aggravate an old problem or to create one or more other problems or disadvantages.

These limitations and disadvantages of the prior art are overcome with the present advantage, however, and improved steering methods and apparatus are provided which eliminate the necessity for conventional speed-reduction or transmission units, which further eliminate the necessity for separate clutches or or braking systems for either track-drive mechanism, and which nevertheless provide the operator with full control of the vehicle vehicle concurrent with a reduction in the power requirements and overall weight of the vehicle.

SUMMARY OF THE INVENTION

In a preferred embodiment of the present invention, a steering system is provided for a track-drive vehicle having a main engine or prime mover of any suitable type for rotating a lateral drive shaft interconnected to simultaneously and concurrently deliver power to both the port and starboard track-drive mechanisms. More particularly, power is delivered through a pair of planetary gear arrangements, wherein a spur-type gear on each end of the lateral drive shaft functions as the sun gear, and wherein the sun gears each engage and drive an assembly of planetary gears which also mesh with the inside teeth of a ring gear.

The planetary gears in each assembly are all pivotally mounted on a suitable carrier plate or the like, and the carrier plate is accordingly fixedly connected to or mounted on the end of the drive shaft which delivers power to the track. Accordingly, rotation of the lateral drive shaft by the prime mover will cause the two sun gears to revolve their respective assemblies of planetary gears which, in turn, will revolve their respective carrier plates and track drive shafts.

It will be noted, of course, that since the planetary gears also revolve about the interior of their respective ring gears, the ring gear may also be rotated in one direction to assist or accelerate such revolvement of the planetary gears therein, or it may be immobillized or even rotated in the opposite direction to retard or even halt revolvement of the planetary gears notwithstanding the lateral drive shaft and sun gears are continuing to rotate.

Control of the two ring gears may conveniently be achieved for such purposes by providing a pair of steering motors which, by appropriate means, may each be connected to rotate a spur gear which meshes with the external teeth of its respective ring gear, and by further providing suitable control means for actuating and driving each steering motor at whatever speed and in whatever direction may be selected by the operator of the vehicle. More particularly, it is a feature of the present invention that means be provided for operating and controlling both of the two steering motors independently of the other.

In such an arrangement, the prime mover of the vehicle may be any suitable type of engine, inasmuch as hydraulic or electrical power for the two steering motors may conveniently be provided by a conventional hydraulic fluid or generator to supply power to the steering motors. More particularly, both steering motors can be activated and employed without creating a demand for any additional power from the prime mover and, when appropriate, can even be operated to contribute additional driving power for moving the vehicle.

In an alternative embodiment of the present invention, the foregoing advantages may also be obtained with an arrangement wherein driving power from the prime mover is applied to the ring gear to revolve the planetary gears and carrier plate, and steering power from the steering motor is applied to the sun gear to control or immobilize the revolving assembly of planetary gears. In such an arrangement, the advantages of the present invention are still obtained inasmuch as steering control is achieved without the need for separate braking and transmission systems, and inasmuch as both the port and starboard steering systems operate completely independently of each other.

In another different embodiment of the present invention, a different type of planetary assembly is employed to deliver power to the track-driving mechanisms. More particularly, a planetary assembly is employed which employs two sun gear and planetary gear assemblies, but which does not employ a ring gear as hereinbefore described. Power from the prime mover is applied to both sets of planetary gears simultaneously by means of a single carrier plate for the purpose of controlling one of the two sun gears to deliver power to the track-driving mechanism, and steering power is applied to the other sun gear to rotate the planetary gears on the carrier plate and affect the speed and direction of rotation of the first sun gear and thereby the track-driving mechanism.

Accordingly, it is an object of the present invention to provide improved and simplified steering and driving means and methods for track-type vehicles and the like.

It is also an object of the present invention to provide improved steering and driving means and methods for tracktype vehicles, wherein steering is achieved for each track mechanism independently of the other.

It is a further object of the present invention to provide improved steering and driving methods and means for tracktype vehicles, without the need of separate clutches, braking systems, or speed-reduction units for either track mechanisms.

It is a specific object of the present invention to provide, in a track-type vehicle and the like having port and starboard track-driving mechanisms and the like, an improved driving and steering system comprising transmission means including port and starboard planetary gear assemblies, a port steering motor, first coupling means for transmitting driving power from said port-side steering motor to said port-side planetary gear assembly and a self-locking worm gearset for blocking transmission of driving power from said port-side planetary gear assembly to said port-side steering motor, a starboard steering motor, second coupling means for transmitting driving power from said starboard-side steering motor to said starboard-side planetary gear assembly and a self-locking worm gearset for blocking transmission of driving power from said starboard-side planetary gear assembly to said starboard-side steering motor, and control means interconnected separately and independently with each of said steering motors.

These and other objects and features of the present invention will become apparent from the following detailed description, wherein reference is made to the figures in the accompanying drawings.

DETAILED DESCRIPTION

Figure 1:
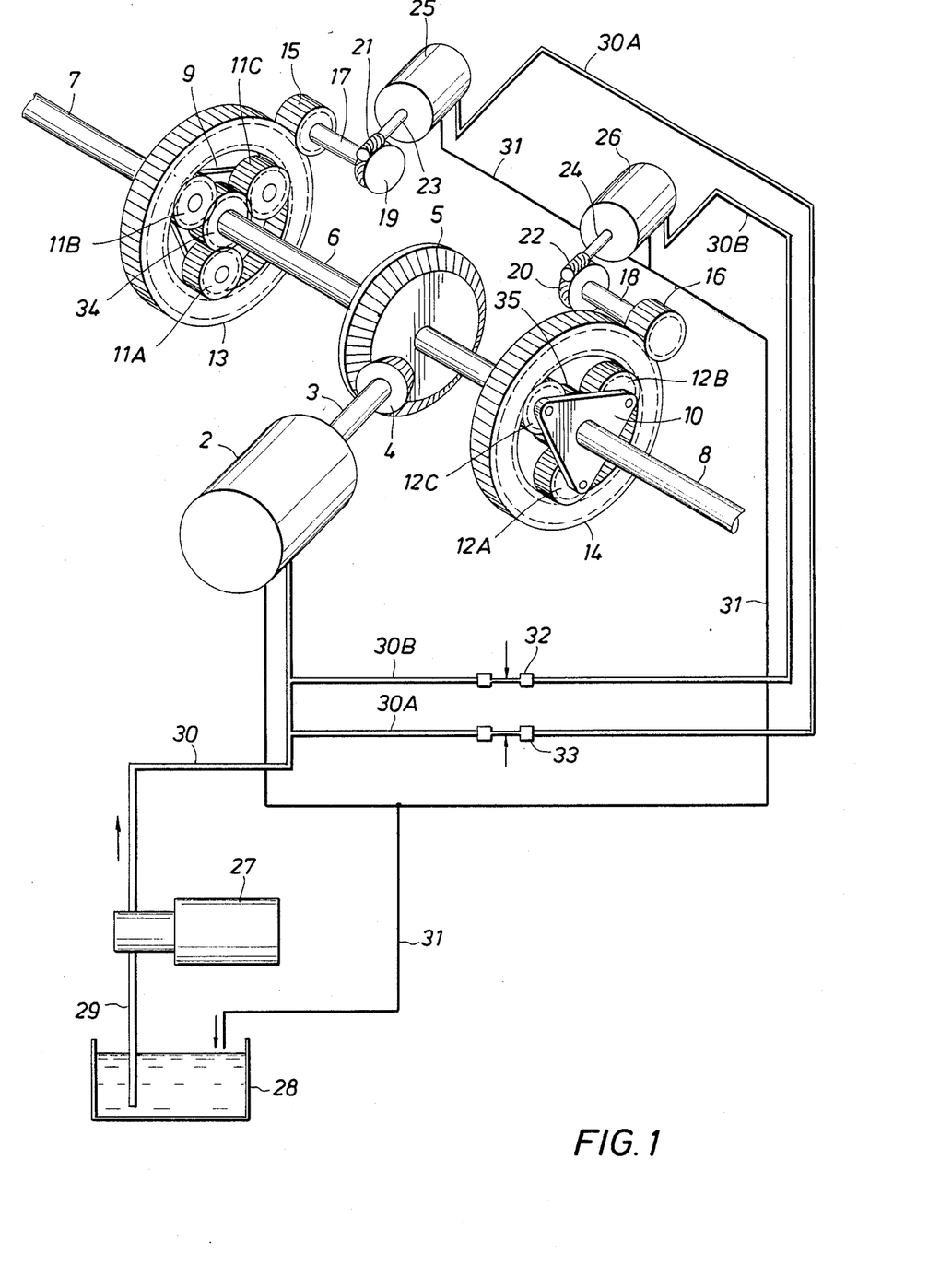
FIG. 1 is a simplified representation of the basic components of one form of apparatus suitable for driving and steering a track-type vehicle according to the concepts of the present invention.

Referring now to FIG. 1, there may be seen one form of apparatus for steering and driving a track-type vehicle according to the concepts of the present invention, and more particularly having a main power source or prime mover 2, which may be any suitable source of power such as a diesel engine or the like, and which may include a suitable pump 27 and hydraulic fluid supply 28 interconnected by lines 30 and 31. It will be apparent that the prime mover 2 must be capable of driving the vehicle in both directions along its longitudinal axis, and therefore the prime mover 2 should conveniently include control valves (not depicted) for appropriately switching fluid flow from the pump 27 which is preferably kept in continuous activation while the vehicle is in use.

Referring again to FIG. 1, it may be seen that the prime mover 2 may also be connected to rotate an axial drive shaft 3 having a pinion gear 4 for engaging and rotating a beveled gear 5 which is fixedly mounted on a lateral axis shaft 6 having spur-type sun gears 34-35 mounted on each end in meshing engagement with the planetary spur gears 11A-C and 12A-C respectively. The port planetery gears 11A-C may be seen to be rotatably mounted on a carrier plate 9 which is fixedly secured to one end of a port track drive shaft 7. Alternatively, the starboard planetary gears 12A-C may each be rotatably secured to a starboard carrier plate 10 which, in turn, is fixedly mounted on the end of a starboard track drive shaft 8.

Rotation of the lateral drive shaft 6 will cause the port sun gear 34 to rotate each of the port-side planetary gears 11A-C, and this will revolve both the port carrier plate 9 and the port track drive shaft 7 to rotate. Similarly, rotation of the starboard sun gear 35 will rotate the starboard planetary gears 12A-C and the starboard carrier plate 10, and this will rotate the starboard track drive shaft 8.

It will also be seen that the port-side planetary gears 11A-C also engage the inside teeth of the port ring gear 13, and therefore rotation of the port-side sun gear 34 will also tend to rotate the port ring gear 13. Similarly, the starboard planetary gears 12A-C also engage the inside teeth of the starboard ring gear 14, and therefore rotation of the starboard sun gear 35 will also tend to cause the starboard ring gear 14 to rotate. Accordingly, actuation of the prime mover 2 and rotation of the axial drive shaft 3 and pinion gear 4 will effectively apply driving power to both the port and starboard track driving mechanisms (not depicted) for moving the vehicle either forward, or in reverse, according to the direction of rotation of the drive shaft 3. In this regard, it should be noted that the speed of rotation of the pinion gear 4 may be controlled by means of any type of suitable speed reduction unit (not depicted) which may be incorporated into the system at any suitable location such as between the axial drive shaft 3 and the prime mover 2. It should further be noticed, of course, that as hereinbefore described, the apparatus depicted in FIG. 1 will drive both planetary gear assemblies at the same rate of speed, and that this will cause the vehicle to move only forward or backward along its longitudinal axis as suggested by the location of the longitudinal drive shaft 3.

Referring again to FIG. 1, it may be seen that the system may also include both port and starboard steering motors 25 and 26, which may be any suitable type of driving mechanisms such as hydraulic motors or electric motors, but not limited to these types of mechanisms. More particularly, the port steering motor 25 is preferably connected to rotate a shaft 23 having a worm gear 21 which engages and rotates a suitable worm wheel gear 19 fixedly mounted on one end of a shaft 17. Similarly, the starboard steering motor 26 is preferably provided with a similarly rotatable shaft 24 having a similar worm gear 22 which engages a similar worm wheel gear 20 fixedly mounted on one end of a shaft 18.

Actuation of the port steering motor 25 will therefore rotate both shaft 17 and the spur gear 15 at its opposite end. Similarly, actuation of the starboard steering motor 26 will rotate both the shaft 18 and the spur gear 16 at its opposite end. Inasmuch as the spur gears 15-16 are each meshed with the external teeth of the port and starboard ring gears 13-14 respectively, it will be seen that actuation of the steering motors 25-26 will tend to either assist, or retard, rotation of the track drive shafts 7-8, depending upon the direction in which the shafts 17-18 are being driven.

Control of both speed and direction of rotation, of the two steering motors 25-26 may be accomplished by means of valves 32-33, which are preferably arranged and adapted to selectively restrict as well as to completely open and close the flow of hydraulic fluid through conduits 30A-B, depending on the choice of the operator of the vehicle. Accordingly, it will be apparent that rotation of the two track drive shafts 7-8 may be achieved completely independently of each other, and at whatever speed may be selected by the operator, whereby effective control of the vehicle may be achieved within reasonable limits. More particularly, the port steering motor 26 may (for example) be used to slow or stop rotation of the port track drive shaft 8 or may also be operated to contribute additional driving power to the port drive system when desired, without affecting in any way the operation of the starboard steering system.

It should be noted that although rotation of the worm gear 21 by the port-side steering motor 25, will easily rotate the ring gear 13, rotation of the ring gear 13 cannot cause the worm gear 21 to rotate. More particularly, if the port-side steering motor 25 becomes disabled for any reason such as a loss of hydraulic power from pump 27, this will immediately secure the ring gear 13 against rotation whereby driving power can continue to be applied to the port-side track mechanism (not depicted). This provides a distinct advantage over those systems of the type illustrated in U.S. Pat. No. 2,025,513, wherein the ring gear will tend to spin out of control and disable the track drive mechanism if loss of steering power occurs.

In the present invention as depicted in FIG. 1, the worm gear 21 cannot be turned by rotation of the ring gear 13, but only by rotation of shaft 23 by the steering motor 25, and if the steering motor 25 becomes disabled for any reason, this will result in immobilization of the ring gear 13 rather than freeing it to spin in reaction to rotation of the sun gear 35 as in the apparatus depicted in U.S. Pat. No. 2,025,513.

Another advantage of the present invention over prior art is that there is no tendency for the steering motors and ring gears to creep, or slowly rotate due to hydraulic leakage or other causes. This creeping, which would lower efficiency and possibly cause maintenance problems, does not exist in the present invention since the ring gears cannot cause the steering motors to rotate.

Figure 2:
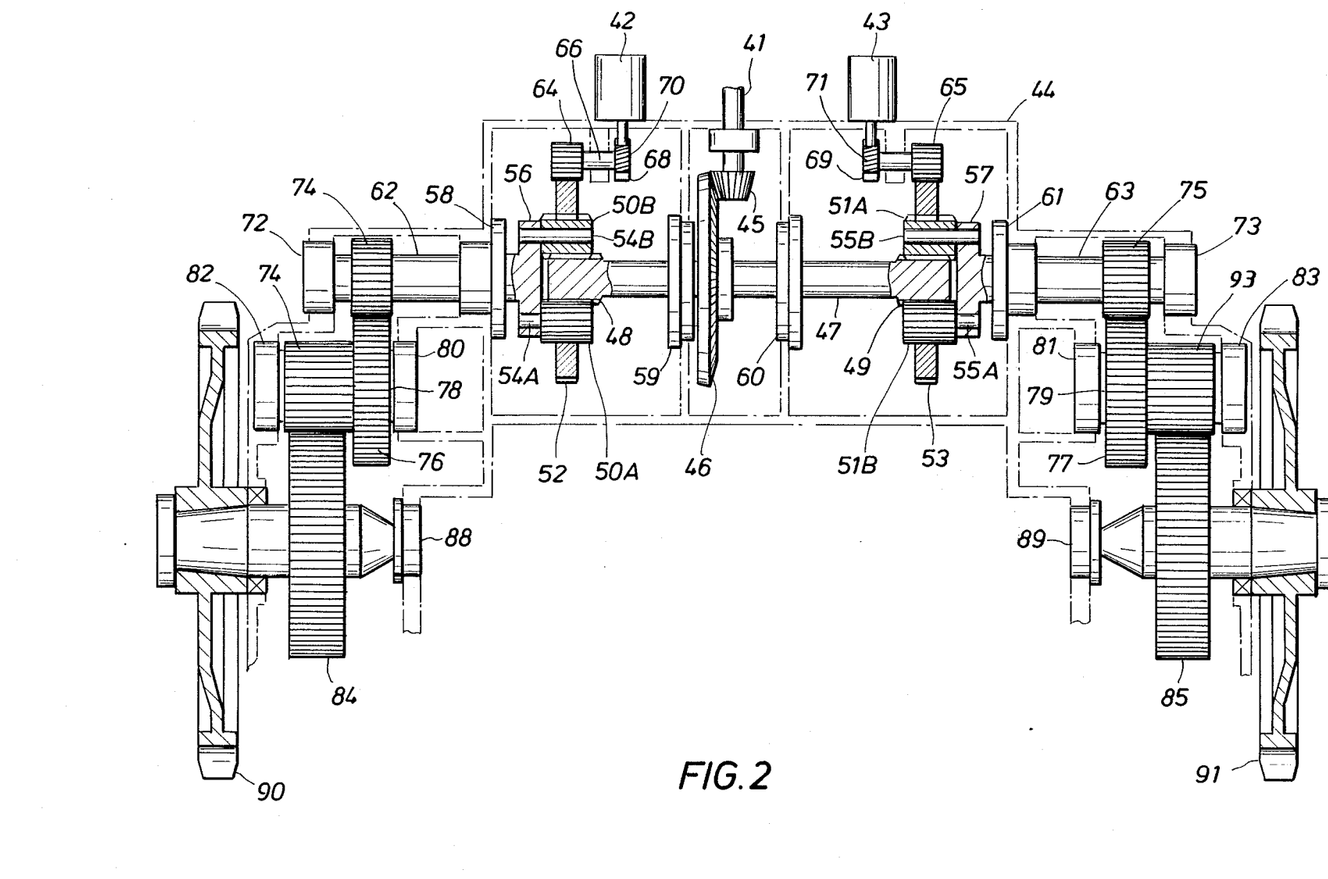
FIG. 2 is a simplified representation of the basic components of another apparatus for driving and steering a track-type vehicle according to the concepts of the present invention.

Referring now to FIG. 2, there may be seen a more detailed representation of the system more simplistically depicted in FIG. 1, wherein driving power may be seen to be provided by way of a drive shaft 41 interconnected with a suitable power supply (not depicted), and which also extends through the wall portion of a suitable housing 44 to rotate a suitable bevel-type pinion gear 45. In addition, port and starboard steering motors 42 and 43 are similarly provided with appropriate drive shafts also extending through the wall of the housing 44 for the purpose of rotating worm gears 70 and 71 in the manner hereinbefore described with respect to FIG. 1.

Referring again to the bevel-type pinion gear 45, it may be seen that this component is rotatably engaged with a suitable bevel gear 46 which, in turn, is fixedly mounted on a shaft 47 rotatably within the housing 44 by bearing members 59 and 60, for rotating spur-type sun gears 48 and 49. More particularly, it will be further seen that the sun gear 48 is meshed with an appropriate number of spur-type planetary gears 50A-B which, in turn, are pivotally connected with a planetary carrier plate 56 by pins 54A-B, and which also mesh with the inner teeth of a ring gear 52 having its external teeth meshingly engaged with a spur-type gear 64 fixedly mounted on one end of a steering shaft 66 having a worm wheel gear 68 mounted on its opposite end for engaging the worm gear 70. Similarly, the purpose of the sun gear 49 mounted on the opposite end of the lateral drive 47 is to mesh with and rotatably engage a suitable number of spurtype planetary gears 51A-B which, in turn, are rotatably mounted on pins 55A-B connected with a suitable planetary carrier plate 57 which, in turn, is fixedly interconnected with the axial shaft 63. The planetary gears 51A-B, in turn, are meshingly engaged with the inside teeth of a suitable ring gear 53 which has its external teeth meshingly engaged with a spur gear 65 mounted on one end of a rotatable drive shaft 67 having a worm wheel gear gear 69 mounted on its opposite end for engaging the worm gear 71.

Figure 3:
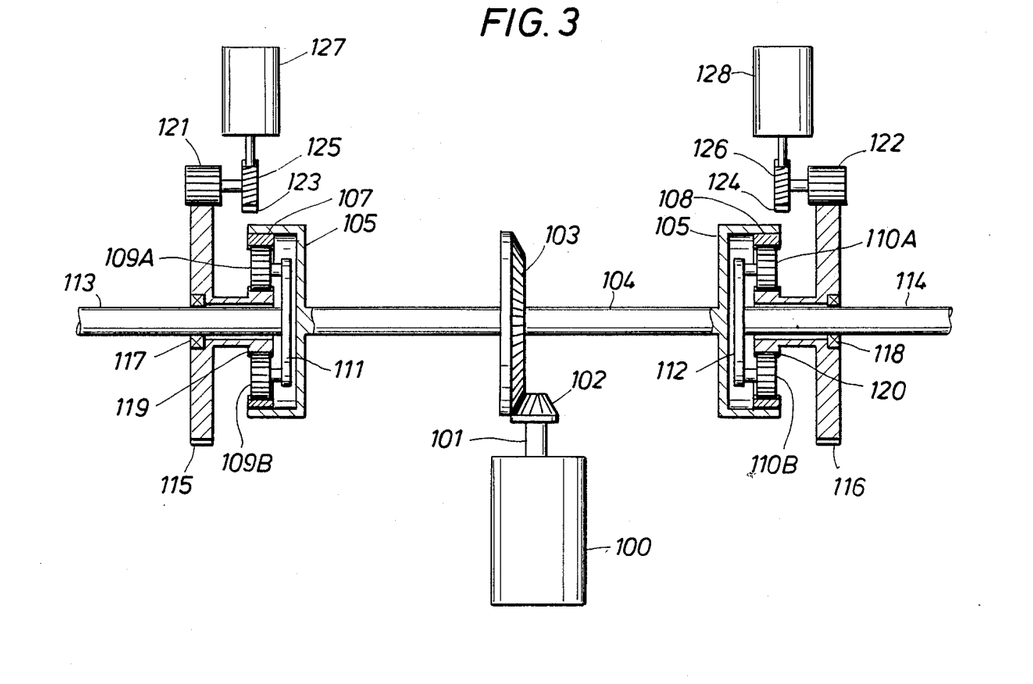
FIG. 3 is a simplified representation of the basic components of a further different form of apparatus for driving and steering a track-drive vehicle according to the concepts of the present invention.

Referring now to FIG. 3, there may be seen a simplified representation of another different form of apparatus embodying the present invention and suitable for steering a tracktype vehicle. More particularly, there may be seen a suitable prime mover 100 having an axial drive shaft 101 with a bevel type pinion gear 102 meshingly engaged with another different bevel gear 103 fixedly mounted on an lateral drive shaft 104 having port and starboard holders 105 and 106 mounted fixedly on opposite ends thereof. Referring first to the apparatus for driving the port-side track (not depicted), there may be seen a drive shaft 113 fixedly interconnected with planetary carrier 111. The sun gear 119, in turn, is meshingly engaged with a suitable plurality of planetary-type spur gears 109A-B which, in turn, are rotatably secured to a suitable carrier plate 111 for meshing engagement with a ring gear 107 supported and driven by the holder 105. In addition, it will be seen that the port side steering motor 127 is interconnected to rotate a worm gear 125 meshingly engaged with a suitable worm wheel gear 123 fixedly mounted on a shaft interconnected with another spur gear 121 which, in turn, meshes with the teeth of the spur gear 115.

Similarly, the starboard track (not depicted) is suitably driven by a shaft 114 which is interconnected with a carrier plate 112 having a suitable number of planetary type spur gears 110A-B pivotally mounted thereon and meshingly engaging with a sun gear 120 which is fixedly connected to a larger spur type gear 116 which, in turn, meshes with a spur gear 122 fixedly mounted on a rotatable shaft having a suitable worm wheel gear 124 mounted on its opposite end. Steering is accomplished by a starboard steering motor 128 which rotates a worm gear 126 engaging the worm wheel gear 124.

Figure 4:
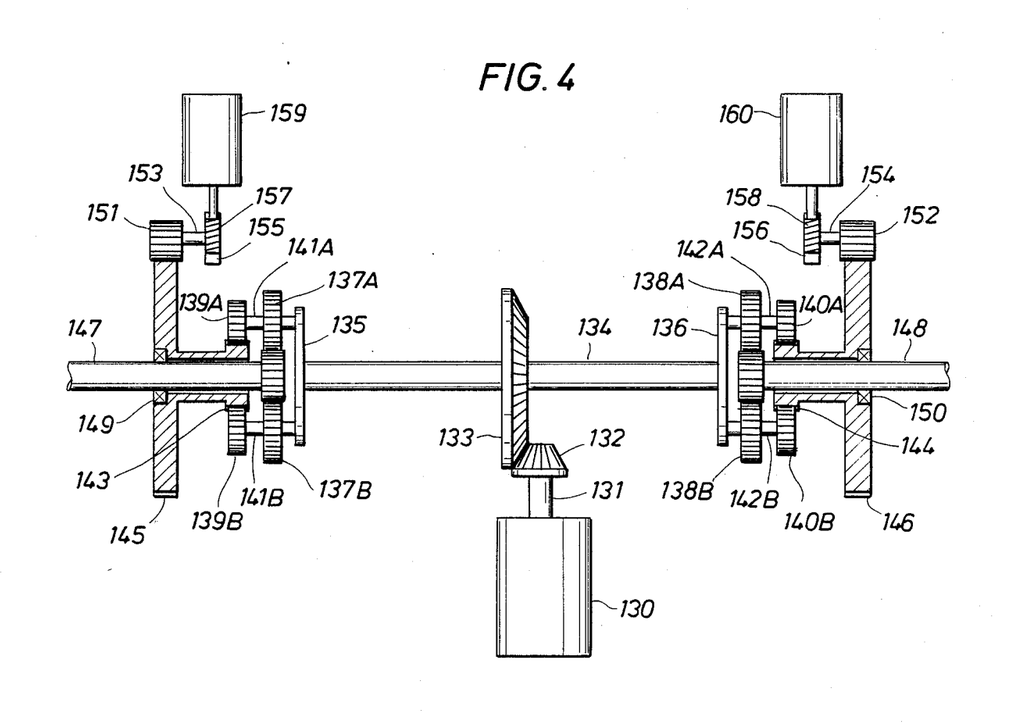
FIG. 4 is another simplified representation of a suitable apparatus for driving and steering a track-type vehicle and embodying the concepts of the present invention.

Referring now to FIG. 4, there may be seen a simplified pictorial representation of another different form of apparatus suitable for both driving and steering a track-type vehicle, and more particularly including a pair of shafts 147 and 148 for respectively driving the port and starboard track assemblies. More particularly, it may be seen that the port drive shaft 147 is fixedly interconnected with a spur gear 161 which meshes with a suitable number of planetary spur gears 137A-B which, in turn, are fixedly mounted on pins 141A-B. Rotatably mounted on the port drive shaft 147, by means of a bearing member 149, is a large spur gear 145 directly interconnected with an appropriate sun gear 143.

The purpose of the large spur gear 145 is to mesh with another steering spur gear 151 which, in turn, is fixedly mounted on one end of a steering shaft 153 having an appropriate worm wheel gear 155 mounted on its other end for engagement with a worm gear 157. The port steering motor 159 operates to rotate a shaft which is fixedly connected with the worm gear 157 for rotating the large gear 145 and sun gear 143, to drive the planetary gears 139A and B.

Similarly, starboard steering is accomplished by means of a suitable starboard steering motor 160 interconnected to drive an appropriate worm gear 158 which meshes with a worm wheel gear 156 fixedly mounted on one end of a shaft 154 having a suitable spur gear 152 mounted on its other end. The spur gear 152 is meshingly engaged with a large spur gear 146 which is rotatably supported on a starboard drive shaft 148 by bearing 150, and is physically interconnected with an appropriate spur gear 144 which, in turn, meshes with suitable planetary gears 140A-B mounted pivotally on pins 142A-B which, in turn, are fixedly interconnected with a suitable planetary carrier plate 136 interconnected with the starboard end of a lateral drive shaft 134. Also rotatably mounted on pins 142A-B are a similar number of spur gears 139A-B which mesh with a sun gear 162 fixedly interconnected on one end of the starboard drive shaft 148 which, in turn, is interconnected at its other end with components (not depicted) for driving the starboard track of the vehicle. In the same manner, there may be seen in FIG. 4 a similar planetary carrier plate 135 fixedly mounted on the opposite end of the lateral drive shaft 134 and carrying pivot pins 141A-B for supporting spur gears 139A-B and the planetary spur gears 137A-B. Rotation of the worm gear 155 by the port steering motor 159 will drive the spur gear 151 to control the speed of rotation of the large spur gear 145 and the spur or sun gear 143, and to thereby control the rotational speed of the planetary gears 139A-B and rotation of the other planetary gears 137A-B controlling the rotational velocity of the sun gear 161.

The steering and drive mechanism depicted in FIG. 4 will, of course, require a suitable prime source of power such as the prime mover 130 which rotates a suitable bevel type pinion gear 132 by means of shaft 131, and which thereby rotates the lateral drive shaft 134 by means of a large beveltype gear 133 fixedly mounted thereon. Accordingly, driving power for both the port and starboard tracts (not depicted) may be achieved by rotation of the lateral drive shaft 134 by the prime mover 130, whereby the carrier plates 135 and 136 are respectively rotated to drive the two sun gears 161 and 162 to rotate the track drive shafts 147 and 148.

Referring again to the apparatus depicted in FIG. 1, it may be seen that the track of the vehicle is driven by rotation of the carrier plates 9 and 10 which are fixedly interconnected with the track drive shafts 7 and 8, respectively, and that the carrier plates 9 and 10 are respectively rotated by revolving the planetary gears 11A-C and 12A-C, by rotating the port and starboard sun gears 34 and 35 by means of the prime mover 2 and lateral drive shaft 6. On the other hand, steering is achieved by controlling rotation of the two ring gears 13 and 14 by use of the port and starboard steering motors 25 and 26.

As more particularly indicated in FIG. 2, the port drive track (not depicted) is driven by the sprocket gear 90 which is mounted on one end of the shaft 86 which, in turn, is rotated by spur gear 84 meshing with spur gear 92. It may further be noted that spur gear 92 is fixedly connected to spur gear 76. Rotation of the spur gear 76 is achieved by rotating another spur gear 74 which is fixedly mounted on a suitable axle 62 mounted between bearings 72 and 58, and driven by rotation of a planetary carrier plate 56.

Similarly, the starboard track draining mechanism 91 in FIG. 2 may be rotated for driving the starboard track (not depicted) of the vehicle, by rotating the shaft 87 which has one end fixedly interconnected with the starboard track driving mechanism 91, and which has its other end rotatably interconnected with a suitable bearing 89. Rotation of shaft 87, in turn, is achieved by revolving a spur gear 85 fixedly interconnected with the shaft 87 and rotation of the spur gear 85 is, in turn, achieved by rotation of another spur gear 93 fixedly mounted on another shaft 79 which is rotatably supported between bearings 81 and 83, and which carries a spur gear 77 as well as the other spur gear 93. The spur gear 77 is, in turn, meshed with another spur gear 75 which is fixedly supported by a rotating shaft 63 mounted between bearing members 61 and 73, as hereinbefore explained with respect to the gearing for driving the port track (not depicted).

Referring again to FIG. 2, driving power may be seen to be provided by way of a drive shaft 41 interconnected with a suitable power supply such as the prime mover 2 depicted in FIG. 1, and which extends through the wall of a housing 44 to rotate a suitable bevel-type pinion gear 45. In addition, port and starboard steering motors 42 and 43 are provided with appropriate drive shafts also extending through the wall of the housing 44 to rotate worm gears 70 and 71 as indicated in FIG. 2.

Referring again to the bevel-type pinion gear 45, it may be seen that this component is rotatably engaged with a suitable bevel gear 46 which, in turn, is fixedly mounted on a shaft 47 supported rotatably within the housing 44 by bearing members 59 and 60, for rotating spur-type sun gears 48 and 49. More particularly, it will be further seen that the sun gear 48 is meshed with an appropriate number of spur-type planetary gears 50A-B which, in turn, are pivotally connected with a planetary carrier plate 56 by pins 54A-B, and which also mesh with the inner teeth of a planetary ring gear 52 having its external teeth meshingly engaged with a spur type gear 64 fixedly mounted on one end of a steering shaft 66 having a worm wheel gear 68 mounted on its opposite end for engaging the worm gear 70. Similarly, the purpose of the sun gear 49 mounted on the opposite end of the lateral drive shaft 47 is to mesh with and rotatably engage a suitable number of spur-type planetary gears 51A-B which, in turn, are rotatably mounted on pins 55A-B connected with a suitable planetary carrier plate 57 which, is fixedly interconnected with the shaft 63.

The planetary gears 51A-B, in turn, are meshingly engaged with the inside teeth of a suitable planetary ring gear 53 which has its external teeth meshingly engaged with a spur gear 65 mounted on one end of a rotatable drive shaft 67 having a worm wheel 69 mounted on its opposite end for engaging the worm gear 71.

The purpose of FIG. 2 is to show how the components which are simplistically depicted in FIG. 1 may be interconnected with the other components necessary to make up a complete driving and steering system for a track type vehicle.

In an alternative embodiment of the present invention, and as more particularly illustrated in FIG. 3, driving power for the port and starboard track assemblies is achieved by applying power from the prime mover 100 to the ring gears 107-108 and planetary gears 109A-B and 110A-B respectively. Steering power, on the other hand, is supplied by the port and starboard steering motors 127-128, and is applied to the sun gears 119 and 120 which engage the planetary gears 109A-B and 110A-B, respectively.

As hereinbefore indicated, in a third embodiment of the present invention prime power is applied through the planetary gears of both the port and starboard planetary gear assemblies to drive one of two sun gears in each assembly, and steering is achieved by applying steering power to the other of the two sun gears in order to control and brake rotation of the first of the two sun gears. More particularly, the second of the two sun gears is arranged to drive a second set of planetary gears (in each planetary gear assembly), which, in turn, is arranged to drive a first of two sets of planetary gears. In this arrangement, the second sun gear will perform or function in the same manner as the ring gear in the first embodiment is rotated to achieve steering. Referring again to FIG. 4, for an illustration of this third embodiment of the present invention, it will be seen that driving power for the port and starboard mechanisms is provided by power from the prime mover 130 to rotate the two carrier plates 135-136, and the rotation of the port carrier plate 135 effectively causes a first pair of planetary gears 137A-B to drive a first sun gear 161 interconnected with the port driving shaft 147. Port side steering, in contrast, is achieved by power from the port steering motor 159 to rotate the large spur gear 145 which, in turn, rotates the second sun gear 143 to control rotation of the second set of planetary gears 139A-B, whereby rotation of this second set of planetary gears 139A-B in turn, controls the speed at which the first set of planetary gears 137A-B each rotate on their respective pins 141A-B with respect to the port carrier plate 135. This is also the case with respect to the components depicted in FIG. 4 for driving and steering the starboard side of the vehicle.

It will be apparent that many other embodiments of the present invention may be provided without departing from the concepts of the invention, and that other variations will become apparent from the techniques and apparatus hereinbefore described and depicted in the accompanying drawings. Accordingly, the invention is not limited to the apparatus and functions hereinbefore depicted and described, but is defined by only the following claims herein.

What is claimed is:

1. In a track-valve vehicle and the like having port and starboard track-driving mechanisms and the like, an improved driving and steering system comprising a prime mover having a first rotatable drive shaft for generating driving power for said vehicle, a second drive shaft positively interconnected with said first drive shaft, a port planetary gear assembly interconnected positively with and between said second drive shaft and said port track-driving mechanism and including at least one sun gear and at least one set of planetary gears in meshing engagement with said one sun gear therein, a starboard planetary gear assembly interconnected positively with and between said second drive shaft and said starboard track-driving mechanism and including at least one sun gear and at least one set of planetary gears in meshing engagement with said one sun gear therein, a port steering motor interconnected with said prime mover, first coupling means for transmitting driving power from said port steering motor to said port planetary gear assembly and for blocking transmission of driving power from said port planetary gear assembly to said port steering motor, a starboard steering motor interconnected with said prime mover, second coupling means for transmitting driving power from said starboard steering motor to said starboard planetary gear assembly and for blocking transmission of driving power from said starboard planetary gear assembly to said starboard steering motor, and control means interconnected separately and independently with each of said steering motors.

2. The apparatus described in claim 1, wherein said control means is also interconnected to deliver driving power to each of said steering motors separately and independently of the delivery of driving power from said second drive shaft to said planetary gear assemblies.

3. The apparatus described in claim 2, wherein said control means is also interconnected to cause said steering motors to separately and independently deliver steering power to their respective planetary gear assemblies independently of and concurrently with rotation of said second drive shaft.

4. In a track-type vehicle and the like having port and starboard track-driving mechanisms and the like, an improved driving and steering system comprising a prime mover having a first rotatable drive shaft for generating driving power for said vehicle, a second drive shaft positively interconnected with said first drive shaft, a port planetary gear assembly interconnected positively with and between said second drive shaft and said port track-driving mechanism and including at least one sun gear and at least one set of planetary gears in meshing engagement with said one sun gear therein, a starboard planetary gear assembly interconnected positively with and between said second drive shaft and said starboard track-driving mechanism and including at least one sun gear and at least one set of planetary gears in meshing engagement with said one sun gear therein, a port steering motor interconnected with said prime mover, first coupling means for transmitting driving power from said port steering motor to said port planetary gear assembly and for blocking transmission of driving power from said port planetary gear assembly to said port steering motor, a starboard steering motor interconnected with said prime mover, second coupling means for transmitting driving power from said starboard steering motor to said starboard planetary gear assembly and for blocking transmission of driving power from said starboard planetary gear assembly to said starboard steering motor, and control means interconnected separately and independently with each of said steering motors, wherein said control means is also interconnected to deliver driving power to each of said steering motors separately and independently of the delivery of driving power from said second drive shaft to said planetary gear assemblies, wherein said first and second coupling means each include, a self-locking worm gearset including a worm-type gear fixedly mounted on the shaft of the corresponding one of said steering motors and a worm wheel gear meshingly engaging said worm-type gear for rotation by said shaft of said one of said steering motors, and a spur gear interconnected with and rotatable by said worm wheel gear as a function of said one of said steering motors and further interconnected with a corresponding one of said planetary gear assemblies.

5. In a track-type vehicle and the like having port and starboard track-driving mechanisms and the like, an improved driving and steering system comprising a prime mover having a first rotatable drive shaft for generating driving power for said vehicle, a second drive shaft positively interconnected with said first drive shaft, a port planetary gear assembly interconnected positively with and between said second drive shaft and said port track-driving mechanism and including at least one sun gear and at least one set of planetary gears in meshing engagement with said one sun gear therein, a starboard planetary gear assembly interconnected positively with and between said second drive shaft and said starboard track-driving mechanism and including at least one sun gear and at least one set of planetary gears in meshing engagement with said one sun gear therein, a port steering motor interconnected with said prime mover, first coupling means for transmitting driving power from said port steering motor to said port planetary gear assembly and for blocking transmission of driving power from said port planetary gear assembly to said port steering motor, a starboard steering motor interconnected with said prime mover, second coupling means for transmitting driving power from said starboard steering motor to said starboard planetary gear assembly and for blocking transmission of driving power from said starboard planetary gear assembly to said starboard steering motor, and control means interconnected separately and independently with each of said steering motors, wherein said control means is also interconnected to deliver driving power to each of said steering motors separately and independently of the delivery of driving power from said second drive shaft to said planetary gear assemblies, wherein said control means is also interconnected to cause said steering motors to separately and independently deliver steering power to their respective planetary gear assemblies independently of and concurrently with rotation of said second drive shaft, wherein said planetary gear assemblies each include a sun gear fixedly mounted adjacent one end of said second drive shaft and rotatable as a function of said prime mover, a carrier plate spaced from and confronting said sun gear, planet gears each meshingly engaged with said sun gear and each rotatably mounted on said carrier plate, and a ring gear having teeth meshingly engaged with each of said planet gears, and further gearingly interconnected with one of said steering motors.

6. The apparatus described in claim 5, wherein said ring gear is interconnected positively with and rotatable by said one steering motor independently of and concurrently with rotation of said second drive shaft and sun gear by said prime mover.

7. The apparatus described in claim 6, wherein said steering motor is further interconnected positively and meshingly with said ring gear for revolving said plurality of planetary-type gears about said sun gear independently of rotation of said sun gear by said second drive shaft.

8. The apparatus described in claim 7, wherein said steering motor further comprises a steering motor interconnected with said control means and having a rotatable motor shaft, a self-locking gear fixedly mounted on the said motor shaft for rotation by said steering motor, a worm wheel gear meshingly engaging said self-locking gear for rotation by said steering motor, and a spur gear interconnected with and rotatable by said worm wheel gear as a function of said steering motor and meshingly engaging the said ring gear.

9. The apparatus described in claim 5, wherein said control means includes means for selectively adjusting the speed and direction of rotation of said motor shaft by said steering motor.

10. The apparatus described in claim 9, wherein said control means and steering motor are further interconnected with said planetary gear assembly for revolving said carrier plate in functional relationship with rotation of said sun gear by said second drive shaft.

* * * * *